US006762218B2

(12) United States Patent
Geprägs et al.

(10) Patent No.: US 6,762,218 B2
(45) Date of Patent: Jul. 13, 2004

(54) IMPACT RESISTANT THERMOPLASTIC MOLDING MATERIALS COMPRISED OF SYNDIOTACTIC POLYSTYRENE, GLASS FIBERS AND THERMOPLASTIC ELASTOMER (TPE) IMPACT MODIFIERS

(75) Inventors: Michael Geprägs, Lambsheim (DE); Konrad Knoll, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 6 days.

(21) Appl. No.: 10/240,681

(22) PCT Filed: Mar. 28, 2001

(86) PCT No.: PCT/EP01/03504

§ 371 (c)(1),
(2), (4) Date: Oct. 3, 2002

(87) PCT Pub. No.: WO01/74942

PCT Pub. Date: Oct. 11, 2001

(65) Prior Publication Data

US 2003/0134964 A1 Jul. 17, 2003

(30) Foreign Application Priority Data

Apr. 3, 2000 (DE) .......................... 100 16 262

(51) Int. Cl.$^7$ ............................. C08L 53/00; C08K 3/40; C08K 7/14; C08K 9/06
(52) U.S. Cl. ......................... 523/214; 524/494; 524/505; 525/92 D; 525/89; 525/98; 525/99
(58) Field of Search .......................... 523/214; 524/494, 524/505; 525/92 D, 89, 98, 99

(56) References Cited

U.S. PATENT DOCUMENTS

| | | | | |
|---|---|---|---|---|
| 5,418,275 A | * | 5/1995 | Okada et al. | 524/504 |
| 5,444,126 A | * | 8/1995 | Okada et al. | 525/391 |
| 5,543,462 A | * | 8/1996 | Okada et al. | 525/74 |
| 5,952,431 A | | 9/1999 | Okada | |
| 6,005,050 A | * | 12/1999 | Okada et al. | 525/68 |
| 6,162,866 A | | 12/2000 | Wuensch | |

FOREIGN PATENT DOCUMENTS

| | | | | |
|---|---|---|---|---|
| EP | 535 582 | | 4/1993 | |
| EP | 755 972 | | 1/1997 | |
| EP | 767 211 | | 4/1997 | |
| EP | 779 329 | | 6/1997 | |
| JP | 05209098 A | * | 8/1993 | C08L/25/04 |
| JP | 06093153 A | * | 4/1994 | C08L/25/04 |
| JP | 07048488 A | * | 2/1995 | C08L/25/00 |
| JP | 07053815 A | * | 2/1995 | C08L/25/00 |
| JP | 07062175 A | * | 3/1995 | C08L/25/00 |
| JP | 09052959 A | * | 2/1997 | C08J/5/00 |
| JP | 09087455 A | * | 3/1997 | C08L/25/00 |
| JP | 09100377 A | * | 4/1997 | C08L/25/00 |
| JP | 11302481 A | * | 11/1999 | C08L/25/04 |
| JP | 2000080228 A | * | 3/2000 | C08L/25/04 |
| JP | 2000143891 A | * | 5/2000 | C08L/23/02 |
| WO | 94/24206 | | 10/1994 | |

OTHER PUBLICATIONS

JPO machine translation of JP 2000143891 A (May 2000) Kinoshita et al.*
JPO machine translation of JP 2000080228 A (Mar. 2000) Kinoshita et al.*
JPO machine translation of JP 09087455 A (Mar. 1997) Otsuki et al.*
JPO machine translation of JP 09052959 A (Feb. 1997) Fujibayashi, Fusaki.*
JPO machine translation of JP 11302481 A (Nov. 1999) Sugioka et al.*
JPO machine translation of JP 09100377 A (Apr. 1997) Okada, Akihiko.*
JPO machine translation of JP 07062175 A (Mar. 1995) Okada et al.*
JPO machine translation of JP 05209098 A (Aug. 1993) Okada et al.*
JPO machine translation of JP 06093153 A (Apr. 1994) Okada et al.*
JPO machine translation of JP 07048488 A (Feb. 1995) Okada et al.*
JPO machine translation of JP 07053815 A (Feb. 1995) Okada et al.*
XP–001015286, Designed Monomers and Polymers, vol. 3, No. 3, pp 299–315 (2000) Gausepohl et al.

* cited by examiner

Primary Examiner—Matthew A. Thexton
(74) Attorney, Agent, or Firm—Keil & Weinkauf

(57) ABSTRACT

Thermoplastic molding compositions comprising, as substantive constituents,

A) from 5 to 96% by weight of a vinylaromatic polymer with a syndiotactic structure, B) from 2 to 50% by weight of an inorganic filler, C) from 1 to 15% by weight of a thermoplastic elastomer based on copolymers made from vinylaromatic monomers, dienes and, where appropriate, 1,1-diphenylethylene, D) from 1 to 10% by weight of a compatibilizer, and, where appropriate, E) from 1 to 15% by weight of an elastomeric particulate styrene-diene block copolymer whose diene content may have been completely or to some extent hydrogenated, and, where appropriate, F) additives, where the total of the percentages by weight of A) to F) is 100.

7 Claims, No Drawings

IMPACT RESISTANT THERMOPLASTIC MOLDING MATERIALS COMPRISED OF SYNDIOTACTIC POLYSTYRENE, GLASS FIBERS AND THERMOPLASTIC ELASTOMER (TPE) IMPACT MODIFIERS

The invention relates to thermoplastic molding compositions comprising, as substantive constituents,
- A) from 5 to 96% by weight of a vinylaromatic polymer with a syndiotactic structure,
- B) from 2 to 50% by weight of an inorganic filler,
- C) from 1 to 15% by weight of a thermoplastic elastomer based on copolymers made from vinylaromatic monomers, dienes and, where appropriate, 1,1-diphenylethylene,
- D) from 1 to 10% by weight of a compatibilizer, and, where appropriate,
- E) from 1 to 15% by weight of an elastomeric particulate styrene-diene block copolymer whose diene content may have been completely or to some extent hydrogenated, and, where appropriate,
- F) additives, where the total of the percentages by weight of A) to F) is 100.

The invention further relates to the use of the thermoplastic molding compositions for producing fibers, films or moldings, and also to the resultant fibers, films or moldings.

Due to its crystallinity, syndiotactic polystyrene has a very high melting point of about 270° C., high stiffness and tensile strength, dimensional stability, a low dielectric constant and high chemicals resistance. Its mechanical property profile is even retained at temperatures above its glass transition temperature. The preparation of syndiotactic polystyrene in the presence of metallocene catalyst systems is known and described in detail in EP-A 0 535 582, for example.

The field of application of syndiotactic polystyrene is severely restricted by its brittleness.

There has therefore been a desire to reduce the brittleness of syndiotactic polystyrene, also termed SPS below, while at the same time improving its impact strength, breaking stress and stiffness.

EP-A 0 779 329 (Idemitzu Kosan) and WO-A 94/24 206 (Dow) have disclosed polymer blends made from syndiotactic polystyrene, from inorganic fillers, from polyphenylene ether and from a rubber component. However, the properties of the blends are still unsatisfactory, for example low flowability and complicated preparation.

EP-A 755 972 describes SPS which has been impact-modified using a mixture of, on the one hand, a block copolymer made from styrene and from hydrogenated butadiene and, on the other hand, a core-shell polymer with a butadiene polymer core. Molding compositions with inorganic fillers are not disclosed.

It is an object of the present invention, therefore, to prepare a thermoplastic molding composition which is based on vinylaromatic polymers with a syndiotactic structure and which combines high impact strength, high stiffness (modulus of elasticity), and good flowability (MVR, processability) and breaking stress.

We have found that this object is achieved by means of the thermoplastic molding compositions defined at the outset.

The use of the thermoplastic molding compositions for producing fibers, films or moldings has also been found, as have the resultant fibers, films and moldings.

As component A), the thermoplastic molding compositions of the invention comprise from 5 to 96% by weight, preferably from 20 to 80% by weight, in particular from 40 to 70% by weight, of a vinylaromatic polymer with a syndiotactic structure. The expression "with a syndiotactic structure" means for the purposes of the present invention that the polymers are substantively syndiotactic, i.e. the syndiotactic content determined by $^{13}C$ NMR is above 50%, preferably above 60%, of mmmm pentads.

Component A) has preferably been built up from compounds of the formula I

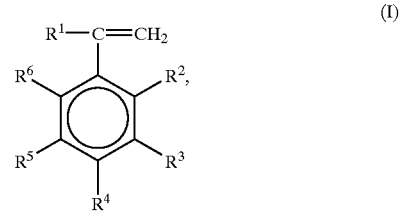

where:
$R^1$ is hydrogen or $C_1$- to $C_4$-alkyl, and
$R^2$ to $R^6$ independently of one another, are hydrogen, $C_1$- to $C_{12}$-alkyl, $C_6$- to $C_{18}$-aryl, or halogen, or where two adjacent radicals together are a cyclic group having from 4 to 15 carbon atoms, such as $C_4$–$C_8$-cycloalkyl, or anellated ring systems.

It is preferable to use vinylaromatic compounds of the formula I where
$R^1$ is hydrogen.

Particular substituents $R^2$ to $R^6$ which may be used are hydrogen, $C_1$- to $C_4$-alkyl, chlorine, phenyl, biphenyl, naphthalene or anthracene. Two adjacent radicals together may also be a cyclic group having from 4 to 12 carbon atoms, examples of resultant compounds of the formula I being naphthalene derivatives or anthracene derivatives.

Examples of these preferred compounds are:
Styrene, p-methylstyrene, p-chlorostyrene, 2,4-dimethylstyrene, 4-vinylbiphenyl, vinylnaphthalene and vinylanthracene.

It is also possible to use mixtures of various vinylaromatic compounds, but it is preferable to use just one vinylaromatic compound.

Particularly preferred vinylaromatic compounds are styrene and p-methylstyrene.

Mixtures of various vinylaromatic polymers with a syndiotactic structure may also be used as component A), but it is preferable to use just one vinylaromatic polymer, in particular syndiotactic polystyrene (SPS).

Vinylaromatic polymers (A) with a syndiotactic structure and processes for their preparation are known per se and are described in EP-A 535 582, for example. The preferred method of preparation is to react compounds of the general formula I in the presence of a metallocene complex and of a cocatalyst. Particular metallocene complexes used are pentamethylcyclopentadienyltitanium trichloride, pentamethylcyclopentadienyltrimethyltitanium, and pentamethylcyclopentadienyltitanium trimethylate.

The vinylaromatic polymers with a syndiotactic structure generally have a molar mass $M_w$ (weight-average) of from 5000 to 10,000,000 g/mol, in particular from 10,000 to 2,000,000 g/mol. The polydispersities $M_w/M_n$ are generally from 1.1 to 30, preferably from 1.4 to 10.

Other vinylaromatic polymers which may be used as component A) and have a syndiotactic structure are syndiotactic star polymers based on vinylaromatic monomers. Examples of these star polymers are described in the earlier German patent application 196 34 375.5-44, in particular on page 2, line 21 to page 6, line 25, and in the examples.

As component B), the molding compositions of the invention comprise from 2 to 50% by weight, preferably from 5 to 45% by weight, in particular from 15 to 42% by weight, of fibrous or particulate inorganic fillers, or mixtures of these.

Examples of these are carbon fibers, glass fibers, glass mats, glass silk rovings or glass beads, or else potassium titanate whiskers, preferably glass fibers. Glass fibers may have been provided with a size or with a coupling agent. These glass fibers may be incorporated either as short glass fibers or else as continuous-filament strands (rovings). Preferred glass fibers comprise an aminosilane size and typically have a diameter D of from 1 to 30 $\mu$m, preferably from 3 to 20 $\mu$m, in particular from 5 to 15 $\mu$m. In the extruded molding compositions of the invention these glass fibers then have a length-to-diameter ratio of from 5 to 100, preferably from 10 to 80, in particular from 15 to 50.

Examples of materials which may be used as component B) are amorphous silica, magnesium carbonate, powdered quartz, mica, talc, feldspat or calcium silicates.

As component C), the thermoplastic molding compositions of the invention comprise from 1 to 15% by weight, preferably from 1 to 10% by weight, of copolymers made from vinylaromatic monomers and from dienes and, where appropriate, 1,1-diphenylethylene. This component C) may also be termed a thermoplastic elastomer (TPE).

Component C) is preferably prepared by anionic polymerization.

Particularly preferred components C) are three-block copolymers, particularly those which have been hydrogenated. The copolymers used as component C) are preferably those prepared from styrene, 1,1-diphenylethylene and butadiene, in particular styrene (S)/1,1-diphenylethylene (DPE)-butadiene-S/DPE three-block copolymers, the butadiene block having been hydrogenated (EB), i.e. (S/DPE)-EB-(S/DPE).

Other suitable copolymers or block copolymers have at least one block A made from vinylaromatic monomers a1) and 1,1-diphenylethylene or its derivatives a2) with substitution of the aromatic rings where appropriate by alkyl groups having up to 22 carbon atoms, obtainable by anionic polymerization, the copolymer or the block A having been formed by using an initiating solution composed of the product from reaction of an anionic polymerization initiator with at least the equimolar amount of monomers a2).

It is preferable to prepare block copolymers having at least one block A and having at least one, where appropriate hydrogenated, block B made from dienes b), using sequential anionic polymerization, by carrying out the following steps in succession:

I) Forming a block A by
I.1) Preparing an initiating solution composed of the product from the reaction of an anionic polymerization initiator with at least the equimolar amount of monomers a2),
I.2) Adding any remaining amount of monomers a2) and from 60 to 100% of the total amount of monomers a1),
I.3) Adding any remaining amount of monomers a1) when the conversion of the monomers added in the preceding steps has reached at least 80%,
the concentration of the polymerization solution after the final addition of monomers being at least 35% by weight,
II) and then forming a block B by
II.1) Adding an additive which affects the polymerization parameters, and II.2) Adding the dienes b), and where appropriate, carrying out the following steps:
III) Adding a chain terminator or coupling agent,
IV) Hydrogenating the block copolymer,
V) Isolating and working-up the block copolymers in a manner known per se, and
VI) Adding stabilizers.

The copolymers or the blocks A are composed of vinylaromatic monomers a1) and 1,1-diphenylethylene or its derivatives a2) substituted on the aromatic rings where appropriate with alkyl groups having up to 22 carbon atoms, preferably having from 1 to 4 carbon atoms, such as methyl, ethyl, isopropyl, n-propyl or n-, iso- or tert-butyl. Preferred vinylaromatic monomers a1) are styrene and its derivatives substituted at the a position or on the aromatic ring with 1 to 4 carbon atoms, for example $\alpha$-methylstyrene, p-methylstyrene, ethylstyrene, tert-butylstyrene or vinyltoluene. Unsubstituted 1,1-diphenylethylene itself is particularly preferably used as monomer a2). The molar ratio of the units which derive from 1,1-diphenylethylene or its derivatives a2) to units which derive from the vinylaromatic monomer a1) is generally from 1:1 to 1:25, preferably from 1:1.05 to 1:10, and particularly preferably from 1:1.1 to 1:3.

The copolymers or the blocks A preferably have a random structure, and their molecular weight $M_w$ is generally from 1,000 to 500,000, preferably from 3,000 to 100,000, particularly preferably from 4,000 to 30,000.

In principle any diene is suitable as diene b) for the block B, but preference is given to those having conjugated double bonds, for example 1,3-butadiene, isoprene, 2,3-dimethylbutadiene, 1,3-pentadiene, 1,3-hexadiene, phenylbutadiene, piperylene and mixtures of these. Particular preference is given to the use of 1,3-butadiene or isoprene. The diene block may have been partially or completely hydrogenated, or be unhydrogenated. The hydrogenation of polyisoprene blocks gives ethylene-propylene blocks, and that of polybutadiene blocks gives polyethylene blocks or polyethylene-butylene blocks as determined by the 1,2-vinyl content of the unhyrogenated butadiene blocks. The hydrogenation makes the block copolymers more thermally stable and especially more resistant to ageing and to weathering. The molecular weights $M_w$ of the blocks B is generally from 10,000 to 500,000, preferably from 20,000 to 350,000, and particularly preferably from 20,000 to 200,000. The glass transition temperatures of the blocks B are generally below −30° C., preferably below −50° C.

The proportion by weight of the total of all of the blocks A, based on the entire block copolymer, is generally from 5 to 95% by weight, preferably from 5 to 50% by weight, particularly preferably from 25 to 35% by weight.

The anionic polymerization is initiated using organometallic compounds. The initiators used may be the usual alkali metal alkyl compounds or alkali metal aryl compounds. It is advantageous to use organolithium compounds, such as ethyl-, propyl-, isopropyl-, n-butyl-, sec-butyl-, tert-butyl-, phenyl-, hexylbiphenyl-, hexamethylenedi-, butadienyl-, isoprenyl- or polystyryllithium. Particular preference is given to the use of 1,1-diphenylhexyllithium, which is easily obtainable from the reaction of 1,1-diphenylethylene with n- or sec-butyllithium. The amount of initiator needed is calculated from the desired molecular weight and is generally from 0.002 to 5 molpercent, based on the amount of monomer to be polymerized.

Suitable solvents are solvents inert toward the organometallic initiator. It is advantageous to use aliphatic, cycloaliphatic or aromatic hydrocarbons having from 4 to 12 carbon atoms, such as pentane, hexane, heptane, cyclopentane, cyclohexane, methylcyclohexane, decalin, isooctane, benzene, alkylbenzenes, such as toluene, xylene or ethylbenzene, or suitable mixtures.

Once the build-up of molecular weight has ended, the "living" ends of the polymer may, if desired, be reacted with conventional chain terminators or with conventional coupling agents, the amounts of which usually depend on the amount of initiator used.

Suitable chain terminators are protonating substances or Lewis acids, such as water, alcohols, aliphatic or aromatic carboxylic acids, or else inorganic acids, such as carbonic acid, phosphoric acid or boric acid.

For coupling of the block copolymers, use may be made of bi- or polyfunctional compounds, for example halides of aliphatic or araliphatic hydrocarbons, such as 1,2-dibromoethane, bischloromethylbenzene, or silicon tetrachloride, dialkyl- or diarylsilicon dichloride, alkyl- or arylsilicon trichloride, tin tetrachloride, polyfunctional aldehydes, such as terephthalic dialdehyde, ketones, esters, anhydrides or epoxides. If the block copolymer is not being hydrogenated, preferred coupling agents used are carboxylic esters, such as ethyl acetate. For hydrogenated block copolymers, it is preferable to use 1,2-dibromoethane or diepoxides, in particular diglycidyl ethers, such as 1,4-butanediol diglycidyl ether.

Examples of an additive (randomizer) used which affects polymerization parameters are Lewis bases, such as polar, aprotic solvents, and metal salts soluble in hydrocarbons. Examples of Lewis bases which may be used are dimethyl ether, diethyl ether, ethylene glycol dimethyl ether, diethylene glycol dimethyl ether, tetrahydrofuran, tetrahydrofurfuryl ethers, such as tetrahydrofurfuryl methyl ether, and tertiary amines, such as pyridine, trimethylamine, triethylamine and tributylamine, and peralkylated di- or oligoamines, such as tetramethylethylenediamine. These are usually used at concentrations of from 0.1 to 5 percent by volume, based on the solvent. Among the metal salts soluble in hydrocarbons, it is preferable to use the alkali metal or alkaline earth metal salts of primary, secondary, or especially tertiary alcohols, particularly preferably the potassium salts, such as potassium triethylcarbinolate or potassium tetrahydrolinaloolate. The molar ratio of metal salt to initiator is usually from 1:5 to 1:200, preferably from 1:30 to 1:100.

The selection of the randomizer and its amount depends on the desired final product. For polymers not intended for hydrogenation and if, for example, when using butadiene, a high 1,4-vinyl content is desired, it is preferable to use a potassium salt soluble in hydrocarbons. For polymers which are intended for subsequent hydrogenation it is preferable to use tetrahydrofuran. The amount used here is preferably such that if butadiene is used, for example, the resultant 1,2-vinyl-content is from about 20 to 50%.

In this process the entire amount of the monomers a2) preferably forms an initial charge in a solvent and is mixed with the polymerization initiator. However, it is also possible for some part of the monomers a2) or of the solvent not to be added until later. The amount of polymerization initiator is calculated by taking the amount calculated from the desired molecular weight and from the total amount of monomer to be polymerized, and adding an amount calculated from any protic contaminants which may be present in monomers or solvent, and which may be removed by filtration to an endpoint. It is preferable to use n- or sec-butyllithium, which reacts completely with the monomers a2) within a few hours, generally from 0.5 to 40 hours at from 20 to 70° C., to give 1,1-diphenylhexyllithium or, respectively, the corresponding substituted derivatives. The temperature of the initial charge is preferably controlled at from 40 to 70° C. while from 60 to 100%, preferably from 70 to 90%, of the entire amount of monomers a1) needed to form the block A is fed. The feed time depends on the reactivity of the monomers used and on the concentration, and is generally from 0.5 to 10 hours and from 40 to 70° C. The addition of the remaining amount of the monomers a1) generally takes place after conversion has exceeded 80%, preferably has exceeded 95%, of the monomers which form the initial charge or have been added by that time. Block A is polymerized at high monomer concentration, and it is possible here to achieve a reduction in the amount of residual monomers a2). The concentration of the polymerization solution after the final addition of monomer is generally at least 35% by weight, particularly preferably more than 50% by weight.

In preparing the block copolymers with at least one block B, a block A is first formed as described above, followed by a block B, by sequential anionic polymerization.

After formation of the A block and prior to addition of the dienes b), the additive which affects the polymerization parameters is added to the polymerization solution. The block B is then polymerized by adding the dienes b). Prior to or during the addition of the diene it is advisable to dilute the reaction mixture with an inert solvent, in order to ensure sufficient mixing and heat dissipation. The polymerization temperature for the block B is preferably from 50 to 90° C., and when using polar, aprotic solvents as randomizer it is particularly preferably from 50 to 70° C.

The resultant A-B block copolymers may be terminated by chain terminators or coupling agents or, in the case of bifunctional coupling agents, linked to give linear three-block copolymers, or in the case of higher-functionality coupling agents, linked to give star-shape block copolymers.

The process is not restricted to solution polymerization. For example, the process can also readily be applied to dispersion polymerization. For this, it is advantageous to use a dispersion medium which is inert toward the anionic polymerization initiators and in which the A block is insoluble, for example, propane, butane, isobutane, pentane or its branched isomers, hexane, heptane, octane or isooctane. In order to obtain a small particle size, from 0.1 to 2% by weight of a dispersing agent is generally added. Examples of suitable dispersing agents are styrene/butadiene two-block copolymers with the highest possible molar mass, for example above 100,000 g/mol.

Other suitable components C) are thermoplastic elastomers such as styrene-butadiene-styrene, for example as described in WO-A 97/40079 (BASF), and Styroflex® BX 6105 from BASF, for example.

As component D), the thermoplastic molding compositions of the invention comprise from 1 to 10% by weight, preferably from 1 to 8% by weight, in particular from 1.2 to 5% by weight, of a compatibilizer which as far as is known at present brings about the coupling to the inorganic filler B). Substances known from the literature may be used, in particular polyarylene ethers.

Polyarylene ethers, and also processes for their preparation, are known per se and are described in DE-A 42 19 438, for example. Among the polyarylene ethers, polyphenylene ethers are particularly suitable, especially polyphenylene ethers modified with polar groups. These polyphenylene ethers modified with polar groups, and also processes for their preparation, are also known per se and are described in DE-A 41 29 499, for example.

The compounds preferably used as component D) are polyphenylene ethers modified with polar groups and built up from $d_1$) from 70 to 99.95% by weight of a polyphenylene ether, $d_2$) from 0 to 25% by weight of a vinylaromatic polymer, and $d_3$) from 0.05 to 5% by weight of at least one compound which contains at least one double or triple bond and at least one functional group selected from the class consisting of carboxylic acids, carboxylic esters, carboxylic anhydrides, carboxamides, epoxides, oxazolines and urethanes.

Examples of polyphenylene ethers $d_1$) are
poly(2,6-dilauryl-1,4-phenylene) ether,
poly(2,6-diphenyl-1,4-phenylene) ether,
poly(2,6-dimethoxy-1,4-phenylene) ether,
poly(2,6-diethoxy-1,4-phenylene) ether,
poly(2-methoxy-6-ethoxy-1,4-phenylene) ether,
poly(2-ethyl-6-stearyloxy-1,4-phenylene) ether,
poly(2,6-dichloro-1,4-phenylene) ether,
poly(2-methyl-6-phenyl-1,4-phenylene) ether,
poly(2,6-dibenzyl-1,4-phenylene) ether,
poly(2-ethoxy-1,4-phenylene) ether, poly(2-chloro-1,4-phenylene) ether, and poly(2,5-dibromo-1,4-phenylene) ether.

It is preferable to use polyphenylene ethers whose substituents are alkyl radicals having from 1 to 4 carbon atoms, for example
poly(2,6-dimethyl-1,4-phenylene) ether,
poly(2,6-diethyl-1,4-phenylene) ether,
poly(2-methyl-6-ethyl-1,4-phenylene) ether,
poly(2-methyl-6-propyl-1,4-phenylene) ether,
poly(2,6-dipropyl-1,4-phenylene) ether and
poly(2-ethyl-6-propyl-1,4-phenylene) ether.

Examples of preferred vinylaromatic polymers $c_2$) can be found in the monograph by Olabisi, pp. 224 to 230 and 245. Merely as examples, mention may be made here of vinylaromatic polymers made from styrene, chlorostyrene, α-methylstyrene or p-methylstyrene. Subordinate amounts (preferably not more than 20% by weight, in particular not more than 8% by weight, of comonomers, such as (meth) acrylonitrile or (meth)acrylates, may also be involved in the structure. Particularly preferred vinylaromatic polymers are polystyrene and impact-modified polystyrene. It is, of course, also possible to use a mixture of these polymers. The preparation process is preferably that described in EP-A 302 485.

Examples of suitable modifiers $d_3$) are maleic acid, methylmaleic acid, itaconic acid, tetrahydrophthalic acid, anhydrides and imides thereof, fumaric acid, the mono- and diesters of these acids, e.g. of $C_1$- and $C_2$- to $C_8$-alkanols, the mono- and diamides of these acids, such as N-phenylmaleimide and maleic hydrazide. Other examples which may be mentioned are N-vinylpyrrolidone and (meth) acryloylcaprolactam.

The elastomeric component E) made from a styrene-diene block copolymer whose diene content may have been to some extent or completely hydrogenated is known, for example from EP-A 755 972, and is commercially available, for example as Kraton® G 1651 from Shell. Other examples are Cariflex®-TR grades (Shell), Finaprene® grades (Fina) and Europrene® grades (Enichem).

The usual amounts of additives or processing aids or mixtures of these may be added to the thermoplastic molding compositions of the invention.

Examples of these are nucleating agents, such as salts of carboxylic, organic sulfonic, or phosphoric acids, preferably sodium benzoate, aluminum tris(p-tert-butylbenzoate), aluminum trisbenzoate, aluminum tris(p-carboxymethylbenzoate), and aluminum triscaproate; antioxidants, such as phenolic antioxidants, phosphites or phosphonites, in particular trisnonylphenyl phosphite; stabilizers, such as sterically hindered phenols and hydroquinones. Use may also be made of lubricants, mold-release agents, dyes, pigments and plasticizers.

Organophosphorus compounds, such as phosphates or phosphine oxides, may be used as flame retardants.

Examples of phosphine oxides are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)phosphine oxide, benzylbis (cyclohexyl)phosphine oxide, benzylbisphenylphosphine oxide, and phenylbis(n-hexyl)phosphine oxide. Particular preference is given to the use of triphenylphosphine oxide, tricyclohexylphosphine oxide, tris(n-octyl)phosphine oxide or tris(cyanoethyl)phosphine oxide.

Phosphates which may be used are especially alkyl- and aryl-substituted phosphates. Examples of these are phenyl bisdodecyl phosphate, phenyl bisneopentyl phosphate, phenyl ethyl hydrogenphosphate, phenyl bis(3,5,5-trimethylhexyl) phosphate, ethyl diphenyl phosphate, bis(2-ethylhexyl) p-tolyl phosphate, tritolyl phosphate, trixylyl phosphate, trimesityl phosphate, bis(2-ethylhexyl) phenyl phosphate, tris(nonylphenyl) phosphate, bis(dodecyl) p-(tolyl) phosphate, tricresyl phosphate, triphenyl phosphate, dibutyl phenyl phosphate, p-tolyl bis(2,5,5-trimethylhexyl) phosphate, and 2-ethylhexyl diphenyl phosphate. Particularly suitable phosphorus compounds are those where each R is aryl. Very particularly suitable compounds here are triphenyl phosphate, trixylyl phosphate and trimesityl phosphate. It is also possible to use cyclic phosphates. Among these, diphenyl pentaerythritol diphosphate is particularly suitable. Preference is also given to resorcinol diphosphate.

It is also possible to use mixtures of various phosphorus compounds.

The total of components A) to F) is 100%.

The thermoplastic molding compositions of the invention may be obtained by mixing the individual components, generally at from 270 to 330° C. in conventional mixing equipment, such as kneaders, Banbury mixers or single-screw extruders, preferably using a twin-screw extruder. To obtain a homogeneous molding composition, intensive mixing is needed. The sequence in which the components are blended may be varied, for example two or, if desired, more components may be premixed, but it is also possible for all of the components to be mixed together.

The thermoplastic molding compositions of the invention may also be blended with other polymers, such as atactic or isotactic homopolystyrene, styrene copolymers with, for example acrylonitrile, methacrylates and/or diphenylethylene as comonomers, or with polyamides, polyesters or polyphenylene ethers, or mixtures of the polymers, generally as described above.

The thermoplastic molding compositions of the invention have high impact strength, high stiffness and good flowability (processability). They are suitable for producing fibers, films or moldings.

EXAMPLES

Preparation of SPS

Preparation of Syndiotactic Polystyrene (SPS)

9.2 mol of styrene (1000 g) formed an initial charge in a round-bottomed flask inertized with nitrogen, and the solution was heated to 60° C. and mixed with 78.3 ml of methylaluminoxane (MAO) from Witco (1.53 molar in toluene) and 20 ml of diisobutylaluminum hydrite DIBAH (1.0 molar in cyclohexane) from Aldrich. The mixture was then mixed with 91.2 mg of [C$_5$(CH$_3$)$_5$]TiMe$_3$. The internal temperature was controlled to 60° C. and the polymerization was allowed to proceed for 2 h, and then terminated by adding methanol. The resultant polymer was washed with methanol and dried at 50° C. in vacuo. The molecular weights and their distribution were determined by high-temperature GPC with 1,2,4-trichlorobenzene as solvent at 135° C. Narrowly distributed polystyrene standards were used for calibration. The molecular weight M$_w$ was 322,100, with a polydispersity M$_w$/M$_n$ of 2.1. The syndiotactic content determined by $^{13}$C NMR was >96%. The conversion was 84%, based on the amount of styrene monomer used.

Experiments 1 to 7

| Fillers: | Glass fibers of length 4.5 mm and L/D ratio 450, with an aminosilane size (PPG 3544 from PPG) |
|---|---|
| Kraton: | Kraton G 1651 from Shell. Block copolymer with styrene-hydrogenated butadiene-styrene blocks. Styrene content: 32% by weight, butadiene content: 68% by weight |
| Styroflex: | Styrene-butadiene-styrene thermoplastic elastomer, e.g. Styroflex ® BX 6105 from BASF AG |
| D-Styroflex: | Styrene/1,1-diphenylethene (DPE)-butadiene-styrene/1,1-diphenylethene block copolymer having 15% by weight of 1,1-diphenylethene in the styrene/1,1-DPE block and 65% by weight of butadiene |
| Antioxidants: | Irganox 1076 |

Blends:

ZSK 30 extruder, melt temperature 290–310° C. Extrudate was first air-cooled then water-bath-cooled and then pelletized.

PPE and SPS were melted, then Kraton and glass fiber added and finally acrylate rubber incorporated. Acrylate rubber was fed either as a dispersion via a mono pump or as a dry rubber.

Production of Test Specimen:
Injection molding at 310° C. melt temperature and 100° C. mold surface temperature.

Experiments 1–7

| Experiment Makeup (% by weight) | Unit | 1* | 2 | 3 | 4 | 5 | 6 | 7 |
|---|---|---|---|---|---|---|---|---|
| SPS$^1$ | | 50 | 50 | 50 | 50 | 50 | 50$^2$ | 50 |
| Glass fiber$^3$ | | 30 | 30 | 30 | 30 | 30 | 30 | 30 |
| PPE modif. | | 5 | 5 | 5 | 5 | 5 | 5 | 5 |
| Kraton | | 15 | | | 5 | 5 | 5 | 5 |
| Styroflex | | | 15 | | 10 | 10 | 10 | |
| D-Styroflex | | | | 15 | | | | 10 |
| IT Extra talc | | | | | | 0.1 | 0.1 | |
| Sodium benzoate | | | 0.02 | 0.02 | 0.02 | 0.02 | 0.02 | 0.02 |
| Modulus of elasticity | MPa | 8614 | 9367 | 9494 | 9188 | 8736 | 8924 | 9511 |
| Yield stress | MPa | 109.2 | 124.6 | 120.3 | 119.9 | 116.4 | 117.1 | 124.4 |
| Elongation at break | % | 2.4 | 2.3 | 2.1 | 2.3 | 2.4 | 2.6 | 2.1 |
| Impact strength ISO 179/1eU | kJ/m$^2$ | 45.3 | 48.1 | 40.8 | 48.5 | 51 | 47.7 | 44.1 |
| Notch impact strength ISO 179/1eA | kJ/m$^2$ | 15.7 | 9.78 | 10.8 | 12.1 | 13.2 | 12.9 | 12.6 |

*Experiment 1 is comparative, not inventive
$^1$SPS: Syndiotactic polystyrene with molecular weight M$_w$ of 246,000, D = 2.4
$^2$SPS: with molar mass M$_w$ of 300,000 g/mol, D = 2.7
$^3$Glass fiber: chained chops PPG 3544, 10 μm

What is claimed is:

1. A thermoplastic molding composition comprising, as substantive constituents,
   A) from 20 to 80% by weight of a vinylaromatic polymer with a syndiotactic structure,
   B) from 2 to 50% by weight of an inorganic filler,
   C) from 1 to 15% by weight of a thermoplastic elastomer based on copolymers made from vinylaromatic monomers, dienes and, where appropriate, 1,1-diphenylethylene selected from the group consisting of non-hydrogenated styrene/diene block copolymer and non-hydrogenated styrene/diene/1,1-diphenylethylene block copolymer,
   D) from 1 to 10% by weight of a compatibilizer,
   E) from 1 to 15% by weight of an elastomeric particulate styrene-diene block copolymer whose diene content may have been completely or to some extent hydrogenated, and, where appropriate,
   F) additives, where the total of the percentages by weight of A) to F) is 100.

2. A thermoplastic molding composition as claimed in claim 1, wherein the amount of C) is from 3 to 12% by weight.

3. A thermoplastic molding composition as claimed in claim 1, wherein the amount of E) is from 1 to 10% by weight.

4. A thermoplastic molding composition as claimed in claim 1, wherein C) is a styrene-butadiene-styrene three-block copolymer.

5. A thermoplastic molding composition as claimed in claim 1, where component B) is glass fibers.

6. A thermoplastic molding composition as claimed in claim 1, with from 15 to 42% by weight of component B).

7. A fiber, a film or a molding obtainable from a thermoplastic molding composition as claimed in claim 1 as substantive component.

* * * * *